US006802995B2

(12) United States Patent
Cree

(10) Patent No.: US 6,802,995 B2
(45) Date of Patent: Oct. 12, 2004

(54) INTERNAL BUBBLE COOLING CONTROL SYSTEM AND METHOD

(75) Inventor: Robert E. Cree, Newark, NY (US)

(73) Assignee: Addex, Inc., Hingham, MA (US)

( * ) Notice: Subject to any disclaimer, the term of this patent is extended or adjusted under 35 U.S.C. 154(b) by 0 days.

(21) Appl. No.: 10/425,418

(22) Filed: Apr. 29, 2003

(65) Prior Publication Data

US 2003/0201557 A1 Oct. 30, 2003

Related U.S. Application Data

(63) Continuation of application No. 09/746,885, filed on Dec. 21, 2000, now Pat. No. 6,562,263.

(51) Int. Cl.[7] ............................................... B29C 47/92

(52) U.S. Cl. ..................... 264/40.3; 264/564; 264/40.6; 425/141; 425/326.1

(58) Field of Search ............................. 425/326.1, 141, 425/72.1, 174.2; 264/40.3, 40.6, 564, 565, 407

(56) References Cited

U.S. PATENT DOCUMENTS

| 4,140,460 A | 2/1979 | Carlsen ....................... 425/140 |
|---|---|---|
| 4,243,363 A | 1/1981 | Mulcahy ...................... 425/140 |
| 4,377,540 A | 3/1983 | Cluett et al. .................. 264/23 |
| 4,508,138 A | 4/1985 | Dixon ......................... 137/239 |
| 4,955,802 A | 9/1990 | Halter et al. ................ 425/72.1 |
| 5,104,593 A | 4/1992 | Joseph ......................... 264/23 |
| 5,468,134 A | 11/1995 | Cree .......................... 425/72.1 |
| 5,525,277 A | 6/1996 | Joseph ....................... 264/40.6 |
| 5,562,926 A | 10/1996 | Karl .......................... 425/72.1 |
| 5,891,383 A | 4/1999 | Joseph ........................ 264/407 |
| 6,562,263 B2 * | 5/2003 | Cree .......................... 264/40.3 |

FOREIGN PATENT DOCUMENTS

DE          19835713          2/2000

* cited by examiner

*Primary Examiner*—Robert Davis
*Assistant Examiner*—Joseph S Del Sole
(74) *Attorney, Agent, or Firm*—Wilmer Cutler Pickering Hale and Dorr LLP

(57) ABSTRACT

An internal bubble cooling air control system in a blown film apparatus has sensors arranged to increase response time and reduce interference, and includes a high speed valve for fast actuation of air flow from a controller in response to signals received from the sensors.

27 Claims, 6 Drawing Sheets

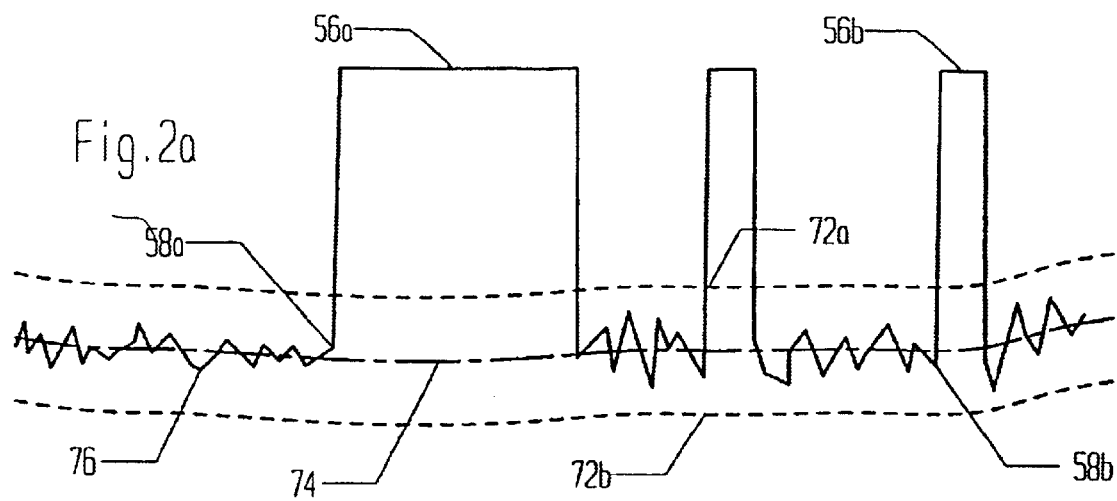
Fig.2a
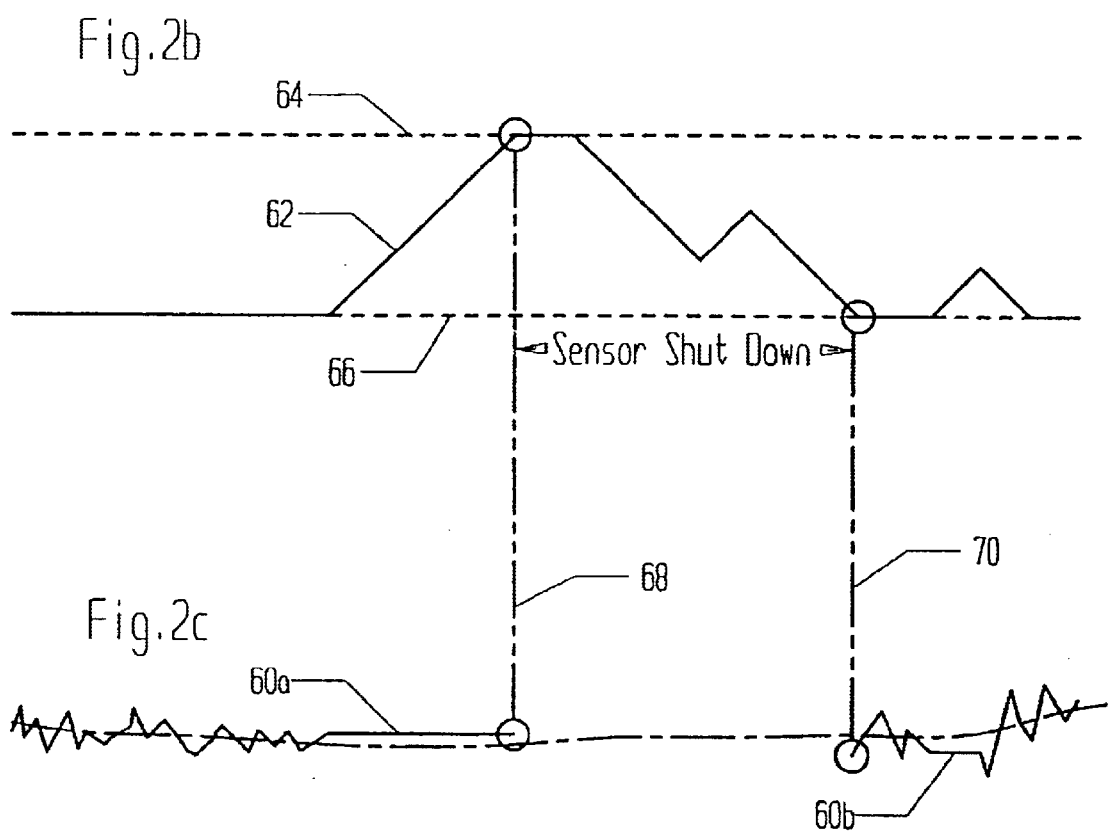
Fig.2b
Fig.2c

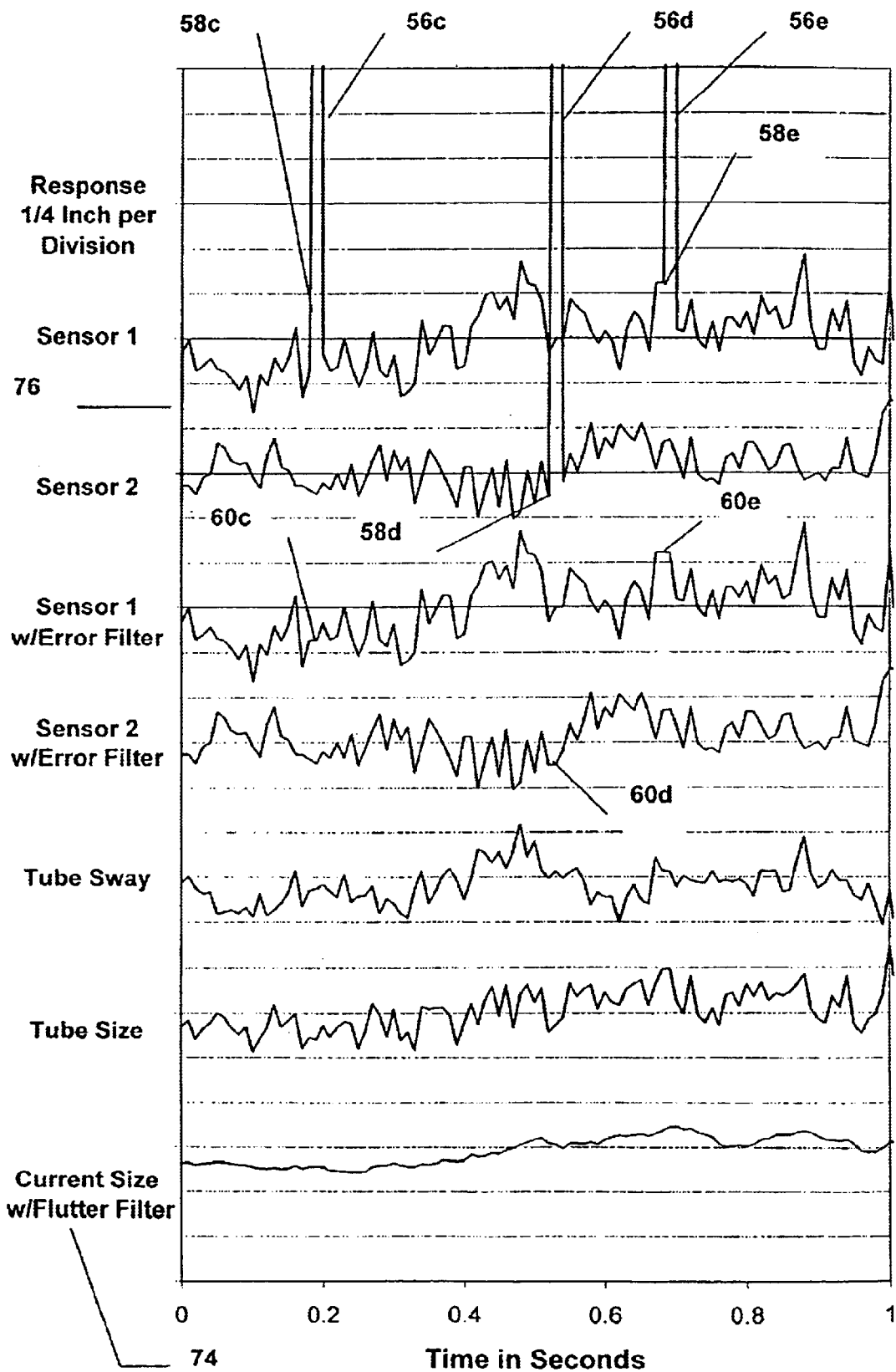
Fig.3    100 Samples/Sensor/Second Response

INTERNAL BUBBLE COOLING CONTROL SYSTEM AND METHOD

CROSS REFERENCE TO RELATED APPLICATION

This application is a continuation of application Ser. No. 09/746,885, filed Dec. 21, 2000, now U.S. Pat. No. 6,562,263.

BACKGROUND OF THE INVENTION

The present invention relates to an internal bubble cooling (IBC) air control for a plastic blown film apparatus.

When blown film is extruded, it typically is in the form of a continuous, vertically oriented tube. The tube, which is in a molten state as it exits a die, expands in diameter as it is pulled continuously upward. The diameter stabilizes to a more or less constant value when the tube cools sufficiently to solidify a short distance from the die at what is called the frost line. Air cooling systems such as external air rings and IBC systems within the tube are provided close to the exit of the die to ensure that the tube cools quickly enough to remain stable.

The tube usually passes through a bubble cage, which minimizes unwanted tube motion and also determines the final tube size if the cage is allowed to contact the tube while the tube is still molten. After solidifying, the tube passes through a flattening device, known as a collapsing frame, to convert the inflated tube into a flattened out film with no air inside. This film is pressed together by motorized nip rolls that continually draw the film upward and away from the extrusion process to form what is call "layflat." The die and nip roll act as seals, which in steady state, form a trapped, column of air with constant volume inside the tube.

Film processors employing IBC systems realize production rate gains on the order of 20% to 50%. In known IBC systems, such as that described in U.S. Pat. No. 4,243,363, air passages are provided through the die to allow for significant air flow into and out of the tube. Air supply and exhaust systems act under the supervision of a control system in response to measured tube size. The control system adjusts the flow of air to be in balance so that a constant, desired tube size is maintained.

For IBC systems to remain stable, there cannot be a significant closed loop lag time between the time when an air flow change first occurs and when the new tube size actually gets sensed by the controller. Excessive total lag time causes a tube to oscillate in size. Typical oscillation periods induced by IBC systems are generally 4 to 6 seconds in duration. This implies that the closed loop lag time must remain less than about 1 second to 1.5 seconds or else the lag time will be greater than 90 degrees out of phase and oscillation will result. Present art IBC systems have a hardware sensor response time and actuation of corrective air flow lag time of about ½ to 1 second. Total closed loop lag time includes this hardware lag time and an additional process related sensing lag time caused by size changes taking place at a point prior to where sensing occurs.

Bubble instability prevents film processors from using IBC systems to achieve higher production rates when extruding many of the newer high performance materials. This instability is caused by a process related sensing lag time that is great enough to force the IBC system into oscillation. Sensing lag time is the time it takes for the molten region of the bubble, which reacts in size to the influence of IBC air flow changes, to move along the process until it has solidified into a final dimension that can be accurately measured at or just after the frost line. Traditionally, older resins such as Low Density Polyethylene (LDPE) react in size to air flow changes very close to or at the frost line, thus providing for minimal sensing time lag time and making it easy to control bubble stability. In the early 1980's, however, Linear Low Density Polyethylene (LLDPE) became commercially viable. LLDPE reacts just prior to reaching the frost line causing a slightly longer sensing time lag of ½ to 1 second. Processors found LLDPE more difficult to control, but by blending in small amounts of LDPE and/or by lowering the IBC size sensors to the frost line or slightly below the frost line, bubble stability could be maintained. Lowering the sensors this far, however, has a disadvantage in that the measured size is no longer accurate. This accuracy problem has been partially addressed by control systems providing for easy re-calibration of measured tube size. More recently, new materials such as metallocenes have further lowered the reaction point, making them difficult or impossible to control with IBC systems. It would be advantageous to sense directly at a reaction point that is well below the frost line without adverse effects on measured size.

An additional problem arises due to the sensitivity of sensor positioning in that the frost line does not stay in one place over time. As material and ambient conditions vary during production, the location of the frost line can change by several inches. This movement causes the processor to constantly monitor and adjust sensor positioning to track with the frost line. Presently, sensor adjustments are made manually by the operator, usually in response to tube oscillation that suddenly appears or actual tube size changes that occur due to degraded tube size calibrations. It would be advantageous to automatically reposition IBC sensors relative to the frost line to maintain sensing lag time constant, thus preventing the onset of tube oscillations. Automatic positioning would also serve to minimize the need for tube size re-calibration although bubble shape effects that can accompany changes in the location of the frost line might still warrant re-calibration, but significantly less often.

Another problem relates to a well documented characteristic that tubes naturally vary in size over short periods of time, independent of any IBC volumetrically related instability, just as processes not using IBC systems do. Experimentation has revealed that with materials in use today, tube size naturally changes in a periodic manner with a frequency of about 1 to 2 Hertz. Tube size changes by as much as ⅓ to ½ inch of layflat for processes with light or no contact with the bubble cage and from 1/10 to ⅓ inch for processes that use the bubble cage to squeeze in just below the frost line and size the bubble. It is a disadvantage to squeeze the tube since marks and scratches routinely result from contact points with the bubble cage. Without squeezing with a cage, IBC control systems must have a total system response time (sensing lag time+sensing response time+ actuator response time) of about 0.1 seconds (10 hertz) or better to control these natural fluctuations. Presently, sensing lag time, response time, and actuator response time individually are each too great to allow for control of natural tube size changes so each must be addressed. It would be beneficial if total system lag time and accuracy could be brought to a level where higher frequency natural bubble instabilities could be controlled by IBC control systems without reducing film quality due to scratches.

IBC control systems employ mechanical, optical, and acoustic sensors for monitoring tube size. Mechanical sensors cause marks on the resulting film and optical sensors tend to get dirty and unreliable in the typical blown film plant environment making them unsuitable for many applications in blown film production. Acoustic sensors are preferred because they provide non-contact sensing and are very reliable in a plant environment. Such systems, however, do have slow sampling rate and problems with sensor interference when more than one acoustic sensor is placed into service around a tube. Acoustic sensors operate by sending out a conical ultrasonic sound pulse and measuring the time it takes for the pulse to bounce off a target, such as the tube, and return back to the sensor which sent the pulse. Distance is then calculated by multiplying the time of flight by the speed of sound in the ambient air that the pulse just traveled through. Blown film bubbles tend to flutter and move around, causing the sound pulses to bounce in many different directions. If the pulse passes by a sensor other than the one that sent it, interference can and usually does occur. Additionally, an originating sensor may not receive the return signal, resulting in a missed target response. Yet another problem is that intervening objects such as operating personnel servicing the system can prevent the acoustic sensor from detecting the bubble as a target, and instead such personnel become the target. These errors lead to incorrect reaction by the control system and thus cause instability in the tube size. Present art systems employ various techniques to minimize these problems at the expense of response time.

A common method and the least expensive overall acoustical approach is to use only one sensor as described in U.S. Pat. No. 5,104,593. This approach suffers the most from inaccuracy due to tube motion. The swaying motions and the flutter of the tube common to the blown film process is perceived by the sensor to be a change in size with corresponding degradation in performance. To combat this inaccuracy and achieve good size control, single sensor systems typically require the use of a bubble cage to surround the tube and forcefully determine tube size, thereby causing scratches and marks in the finished film. Interference with other sensors is not an issue, and this approach allows for sampling rates of 25 to 30 times per second, but a dual stage software filtering system is required to prevent misidentifying noise or bubble sway as an actual change in tube size thus allowing it to track only relatively gradual changes in tube size. The first stage of the filter requires an average of 8.5 samples to effect a change in output yielding an approximate ⅓ second response time. The second stage further limits response time.

Another common method, as described in U.S. Pat. No. 4,377,540, is to use more than one acoustic sensor by alternately operating each sensor one at a time in sequence and wait long enough between samples to prevent interference. In this approach multiple sensors sample tube size preferably from diametrically opposed positions, thus canceling the effects of tube sway. Due to the time delays present and lower operating frequencies, however, these systems allow for only 10 samples to be taken per second. True diameter measurements without influences from swaying require at least 2 samples limiting this approach to ⅕ second sensing response which is then further limited by filtering elements necessary for outside noise immunity.

Yet another approach uses multiple sensors operating in a free run mode with sampling rates of 40 to 50 times per second without regard for alternating sensor operation. Here, sensors are placed so that stray signals typically bounce away from one another. Interference can still occur, however, so a special rate filter is employed to eliminate the effects of inter-sensor interference and missed targets. Experiments have determined that this approach has a typical sensor response time on the order of ⅕ to ⅛ second.

None of the present systems can tolerate the accidental placement of intervening objects in front of acoustic sensors. Typically, objects placed in front of sensors lead to significant bubble instability sufficient to force the extrusion line to shut itself down.

Significant limitations also exist with actuators that adjust air flow. Most IBC air flow actuators are butterfly style valves. These valves suffer from inaccuracy due to linkage backlash and are either motorized or respond to the position of a spring loaded air cylinder. Other actuators are of the bladder valve design, which has no backlash, and operates by inflating or deflating a series of bladders contained inside the air system piping to change the resulting air flow restriction. Yet another design uses a spring loaded air cylinder to position a linear slide valve that also has no backlash, but suffers from problems with positioning errors due to drag in the valve and air cylinder. Experiments have revealed that motorized valves have reaction times of about ½ to 1 second, while spring loaded air cylinders and bladders use pneumatic systems that move air to pressurize or depressurize the actuator with total reaction time of ⅓ to ¾ of a second. Unfortunately, actuators generally in use today in blown film systems do not have the reaction time or accuracy required for controlling natural high frequency bubble instability.

SUMMARY OF THE INVENTION

The present invention includes an internal bubble cooling (IBC) and control system using acoustic sensors that measure tube size resulting from the blown film extrusion apparatus. The IBC control system provides for size sensors located above the frost line where the size of the bubble is stable, to maintain tight calibration of actual tube size. Separate control sensors are adjustable in position at a vertical location below that of the size sensors. These control sensors are preferably located at or below a point just above the frost line, and may be well below the frost line, so that in production these control sensors can be positioned at the point of maximum bubble size reaction to internal air flow changes to compensate for high speed size fluctuations.

Size and control sensors initially are calibrated by having operating personnel inputting actual manually measured size into the system and applying this size data independently to each sensor to establish a separate respective calibration value. Size sensor calibrations remain fixed until a next operator calibration. These size sensors are then used in an integrating mode to constantly re-calibrate each separate control sensor, thus allowing them to be located wherever necessary just above or below the frost line to control the process.

The initial calibrations for control sensors are stored separately and are compared to the integrated re-calibration ongoing for each control sensor. As the position of the frost line naturally changes over time, the control sensor location is automatically adjusted, usually by means of positioning the sizing cage to which they are attached. Position adjustments are made until the integrated re-calibration again matches the initial calibration for the control sensors.

Signals representing a position of the bubble are then provided to control logic in a controller to cause more or less cooling air to flow onto the bubble.

The present invention also includes a sensing method that requires no time averaging of signals to eliminate bad readings and allows for full speed operation of the sensors. Preferably, more than one sensor is used for sizing and more than one is used for controlling. Use of multiple sensors provides a redundancy that allows for rapid filtering by analyzing each sensor's response for false readings. Statistically, there will be at least one sensor that detects the bubble close to where it has been within a tolerance of preferably 1 to 2 inches from previous measurements. All sensors are compared to one another, and any sensor that falls outside a specified tolerance band are ignored. Further, if a majority of the responses from a given sensor are bad, that sensor is automatically taken out of service without shutting down the process. A warning, such as a warning light, can be turned on (or a normally "on" light turned off) separately for each sensor to inform the operator that a sensor is being automatically ignored; if a sensor is being ignored, the warning light remains on permanently until the sensor begins to again provide a majority of good responses.

The present invention further includes a control system which synchronizes and simultaneously fires all acoustic sensors, and then waits a delay time, such as 3 to 16 milliseconds (depending on sensor arrangement), that is long enough for any stray signals to bounce harmlessly away without causing inter-sensor interference before repeating the sequence. By desirably positioning size and control sensors each as pairs of diametrically opposed sensors, true bubble size measurements can be made within a single multiple-sensor cycle without the unwanted effects of bubble sway and without interference problems. Combining synchronized rapid firing with redundancy filtering allows for simultaneous, reliable and accurate measurement of the tube for control and sizing between 60 and 300, and preferably 100, times per second, with no need for further filtering.

Yet another feature of the present invention relates to a linear valve which both precisely meters the amount of air flow and actuates at a very high speed. The linear valve operates by positioning a piston inside of a double pipe arranged with longitudinal slots that, when partially uncovered, control the amount of air flowing from the innermost to the outermost pipe. According to the invention, a linear servo motor is employed (rather than an air cylinder) for piston positioning together with a vertical orientation, and the piston and wall around the piston are designed for minimal friction to yield fast and precise metering of air flow.

Other features and advantages will become apparent from the following detailed description, drawings, and claims.

BRIEF DESCRIPTION OF THE DRAWINGS

FIGS. 2(a)–2(c) are graphic depictions of the operation of the filtering system according to the present invention, showing automatic sensor shut-down and turn-on.

FIG. 3 is a graphic depiction of the actual operation of the filtering system on a blown film extrusion line for two sensors diametrically opposed with the resulting tube sway, tube size, and flutter filter results.

DETAILED DESCRIPTION

Figure 1:
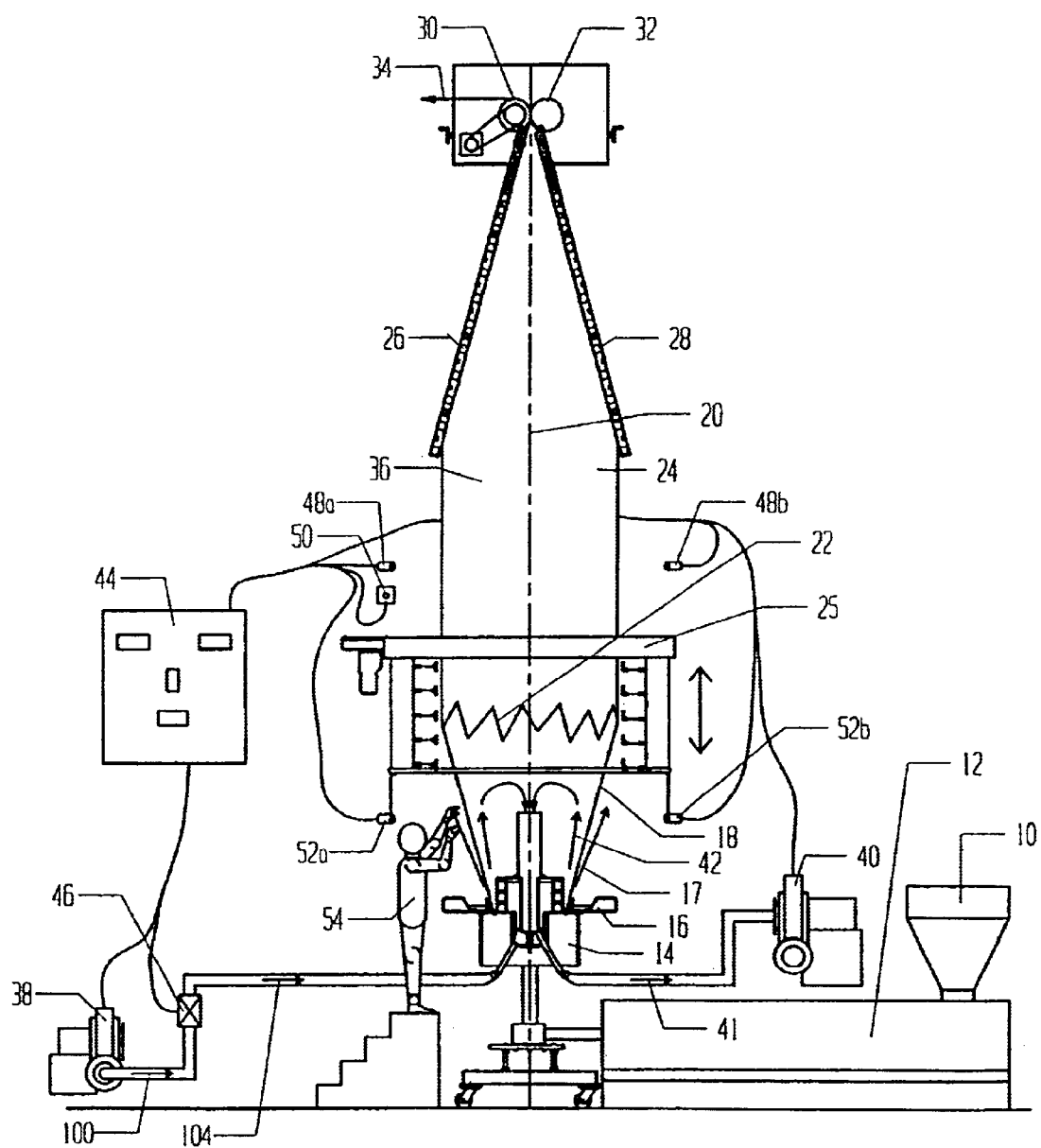
FIG. 1 is a schematic side view of an extrusion line and an internal bubble cooling and control system according to the present invention.

Referring to FIG. 1, plastic resin is provided into an extruder 12 from a holding bin 10. Extruder 12 provides a plastic melt to the bottom of a blown film die 14, which in turn provides an annular plastic melt concentric with a process centerline 20. The melt passes through a cooling ring 16, which blows external cooling air 17 onto the annular plastic melt. The melt forms a conically expanding molten tube 18, which solidifies into a continuous cylindrical bubble 24 above a freeze line 22. Bubble 24 may be stabilized by a bubble cage 25. Bubble 24 is converted to a layflat sheet of film 34 as it passes through collapsing shields 26 and 28, and motorized nip rolls 30 and 32 that continually draw the film upwardly from the extrusion process. Bubble 24 is thus converted into a finished plastic film product, such as plastic bags or rolls of film.

The finished size of film 34 is directly related to the diameter of bubble 24 according to the following formula:

(layflat sheet of film 34 width)=pi*(diameter of bubble 24)/2

The diameter of bubble 24 is determined by bubble volume 36 contained on all sides by bubble 24, conically expanding molten tube 18, the top surface of die 14, and the nip point of motorized nip rolls 30 and 32. Air is either trapped inside bubble volume 36 or is continuously circulated into and out of bubble volume 36 by supply blower 38 and exhaust blower 40, respectively. Outgoing air flow 104 from supply blower 38 is directed into bubble volume 36 though passages in die 14 so that internal bubble cooling (IBC) air 42 may be used to more quickly cool conically expanding molten tube 18 and thereby increase total system throughput and is balanced with exhaust air 41 that is directed out of bubble volume 36 though passages in die 14 so as to maintain a constant size bubble 24.

The total amount of air passing into bubble volume 36 through supply blower 38 must equal the total amount of air exiting through exhaust blower 40, or else a size change will occur immediately somewhere (depending on material types) within the conically expanding molten tube 18. Due to the upward motion of bubble 24 caused by the action of motorized nip rolls 30 and 32, this size change will accelerate from typically slow speeds just above die 14 through the conically expanding molten tube 18 region and ultimately translate upwards in bubble 24 at the speed of the motorized nip rolls 30 and 32, and eventually appearing as a size change in film 34.

In order to control accurately the finished size of film 34, IBC controller 44 is used to balance air flow into and out of bubble volume 36 by altering the speeds of supply blower 38 and exhaust blower 40. Additionally, to obtain finer size control of film 34, optional air flow valve 46 rapidly modulates incoming air flow 100 from supply blower 38 as outgoing air flow 104 through a conduit as shown. Air flow control valve 34 can be located in the exhaust air piping system; for cleanliness reasons, however, it is preferably located in the supply air piping system to minimize fouling. In systems not utilizing air flow valve 46, incoming air flow 100 from supply blower 38 and outgoing air flow 104 are the same air streams and are adjusted by means of speed changes to supply blower 38.

IBC control system 44 utilizes a closed loop control strategy for determining what change to make in the balance of air flow by measuring the final dimension of bubble 24 somewhere at or above frost line 22 using sensors 48a and 48b. Although sensors 48a and 48b can be of any type, it is preferred that they be non-contacting sensors, and preferably acoustic sensors, so as not to contact bubble 24 and hence potentially mark it. One or more sensors can be used, but it is preferred to employ a pair of sensors located on opposite sides of bubble 24 to compensate for swaying motion exhibited by bubble 24 and that is not prevented by bubble cage 25. Compensating sensor 50 is provided to correct for influences on acoustic sensors 48a and 48b by ambient air conditions such as temperature, humidity, and pressure, changes in which can change the speed of sound.

The time it takes for size changes in bubble 24 to translate upwardly from within conically expanding molten tube 18 to the sensing location of sensors 48a and 48b can be quite lengthy. If this time grows too large (greater than about 1 to 2 seconds), control loop instability will result. Newer plastic materials now react in a region significantly below frost line 22 and thus do not allow sufficient time for size changes to even reach frost line 22 in under the required 1 to 2 seconds. Sensors 52a and 52b are therefore provided below frost line 22 and are aimed directly at a reaction point where size changes actually occur in conically expanding molten tube 18, in order to reduce the lag time from the reaction point to the sensing point of sensors 52a and 52b to near or equal to zero. IBC controller 44 uses this rapid response of sensors 52a and 52b to accurately control the size of the reaction point within conically expanding molten tube 18.

Rather than measuring the true diameter of the reaction point, IBC controller 44 continuously calibrates sensors 52a and 52b to the final size of bubble 24 using an internal integrating loop dependent on measurements taken by sensors 48a and 48b. Calibration of sensors 48a and 48b are independently done by an initial direct input to controller 44 of measurements take manually by operating personnel 54. Controller 44 stores these calibration and continuous calibration values separately for each sensor 48a, 48b, 52a, and 52b, respectively. When these separate calibration values are added to actual sensor distances measured by sensors 48a, 48b, 52a, and 52b, respectively, each results in a value equal to the actual size of bubble 24. This approach allows for any sensor to be taken temporarily or permanently out of service without impacting the measured size of bubble 24 and therefore without causing the process to shut down. When any sensor 48a, 48b, 52a and/or 52b is taken offline for extended periods of time (several seconds or more), control performance may be temporarily diminished due to the sway which may be present in bubble 24, but this situation is preferable to shutting down the process. Periods of short duration do not significantly affect the control.

Initial calibration of sensors 52a and 52b are also independently done by an initial direct input to controller 44 and are stored separately and are compared to the continuous calibration values being stored for sensors 52a and 52b. As the position of the frost line 22 naturally changes over time, the sensors 52a and 52b are automatically re-positioned, usually by means of re-positioning bubble cage 25 to which they are attached. Position adjustments are made until the continuous calibration values again match the initial calibration values stored for sensors 52a and 52b. The monitoring and detection of the frost line is generally known, e.g., through the use of an infrared sensor.

Referring also to FIGS. 2 and 3, controller 44 continuously monitors and redundantly compares sensors 48a, 48b, 52a and 52b to a current size 74 of bubble 24 for errors. An allowed deviation band bounded by 72a and 72b (FIG. 2a) of about twice the normal deviation present for non-error samples (about 1 inch) is applied to a current size 74 and compared to the most recent samples 76 each for sensors 48a, 48b, 52a and 52b. Any error samples 56a, 56b, 56c, 56d and 56e which fall outside the prescribed deviation band 72a and 72b cause the most recent good sample 58a, 58b, 58c, 58d and 58e from respective sensor 48a, 48b, 52a and 52b to be used as a lock-in for sample 60a, 60b, 60c, 60d and 60e in place of error sample 56a, 56b, 56c, 56d and 56e respectively. Current size 74 is then recalculated as either the mean (preferred), median or mode of the most recent samples 76 or lock-in samples taken from sensors 48a, 48b, 52a and 52b. This approach prevents large transients due to such error samples from inadvertently affecting the control of the size of bubble 24.

Additionally, operating personnel 54 (FIG. 1) routinely need to access the area around conically expanding molten tube 18 to monitor the performance of the process and to make optimizing changes in such equipment as cooling ring 16. Occasionally, operating personnel 54 inadvertently place hands or other extremities in front of sensors 48a, 48b, 52a and/or 52b causing errors in the measured distance to bubble 24 or conically expanding molten tube 18. Other errors occur due to flutter and swaying motion of bubble 24 or conically expanding molten tube 18 when acoustic sensor signals bounce off at angles away from the originating sensor 48a, 48b, 52a or 52b such that the sensor 48a, 48b, 52a, or 52b does not detect the target and assumes a target at its respective maximum range. In error situations such as these, many successive error samples 56a and 56b will typically result.

Controller 44 uses the most recent good samples 58a and 58b to act as lock-in samples 60a and 60b for each successive error sample 56a and 56b, respectively, until controller 44 determines that a simple majority of samples results are due to an error condition. If such an error condition is detected controller 44 shuts off the respective sensor 48a, 48b, 52a, and 52b until a simple majority of sample results are good. A simple majority of samples is preferably determined by adjusting an error/good count 62 upward by one count for an error signal and downward by 1 count for a good signal. If the error/good count 62 reaches a predetermined maximum count 64 (e.g., a count of 16), the error/good count 62 is prevented from going above the maximum count 64 and the sensor 48a, 48b, 52a and 52b shuts down at sample position 68. If the error/good count reaches zero count 66, the count is prevented from dropping below zero count 66 and sensor 48a, 48b, 52a, or 52b turns back on at sample position 70. This process provides also for a lag time prior to turning on or off a good or bad sensor 48a, 48b, 52a and 52b.

To summarize the use and benefits of multiple sensors with the ability to disregard one or more at a time, the use of more than one sensor, such as sensors 48a and 48b, compensates for sway, and ensures accurate operation for many types of film. As indicated above, one of sensors 48a and 48b can be disregarded, and thus at the vertical position of sensors 48a and 48b, the system can operate with as few as one sensor without shutting down the process. As also indicated above, a sensor may be shut off because operating personnel need access to the area around the tube to make adjustments and the personnel may block a sensor.

While a sensor is not providing good samples, a notification is provided, such as a light changing from on to off (or vice versa).

Figure 4:
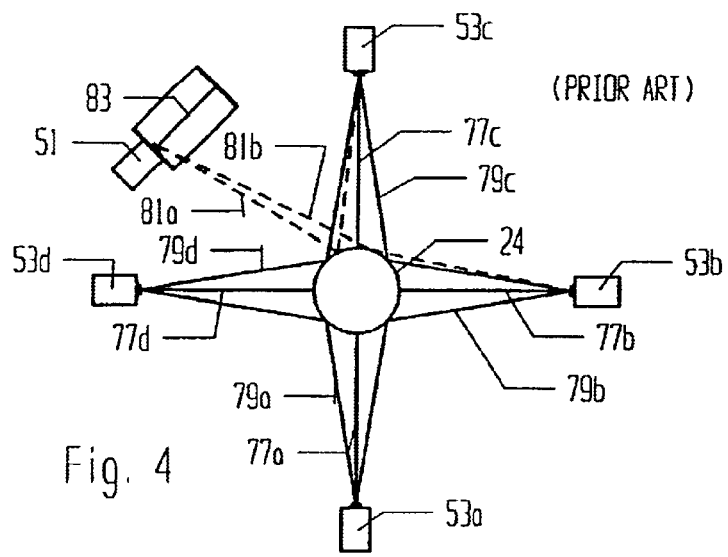
FIG. 4 is a plan view of a sensor arrangement for known systems.

FIG. 4 illustrates the known use of sensors 53a, 53b, 53c, and 53d, and compensating sensor 51 all at one height. For proper response to occur, sound must be issued by each sensor 53a, 53b, 53c, 53d and 51 and follow the path 77a, 77b, 77c, 77d and 83 straight out and back to sensor 53a, 53b, 53c, 53d and 51, respectively. In this configuration, possible interference paths 79a, 79b, 79c, and 79d between adjacent sensors occur. Sensor signals originating from sensor 53a can reflect off of bubble 24 and false trigger sensor 53d or 53b along paths 79a or 79b, respectively, or vice versa, and similarly for each of adjacent sensors 53a, 53b, 53c and 53d around bubble 24. Additionally, sensors 53c and 53b can interfere or be interfered by sensor 51 along paths 81a and 81b respectively.

Figure 5:
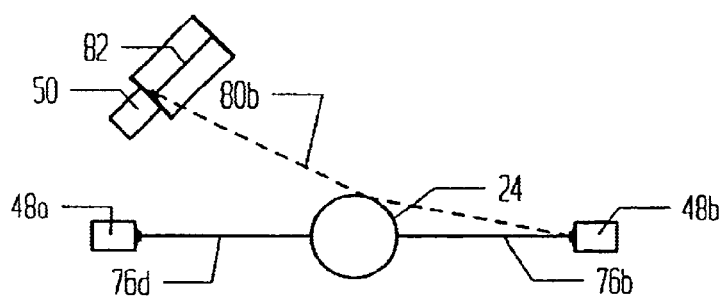
FIGS. 5 and 6 are plan views of the sensor arrangement for size and control sensors respectively according to the present invention.
Figure 6:
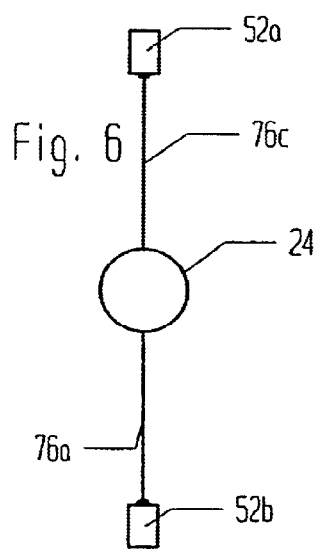

FIG. 5 and 6 illustrate the use of sensors 48a, 48b, 52a, 52b, and compensating sensor 50 at differing heights to minimize possible interference paths according to an embodiment of the present invention. Sensors 48a, 48b and compensating sensor 50 are maintained above frost line 22 in a preferentially diametrically opposed position and far enough separated from the plane of sensors 52a and 52b mounted near to or below frost line 22 so as to eliminate possible interference paths between adjacent sensors 48a, 48b, 52a, and 52b as shown in FIG. 4. Only one path 80b for interference between sensor 48b and compensating sensor 50 exists.

Figure 7:
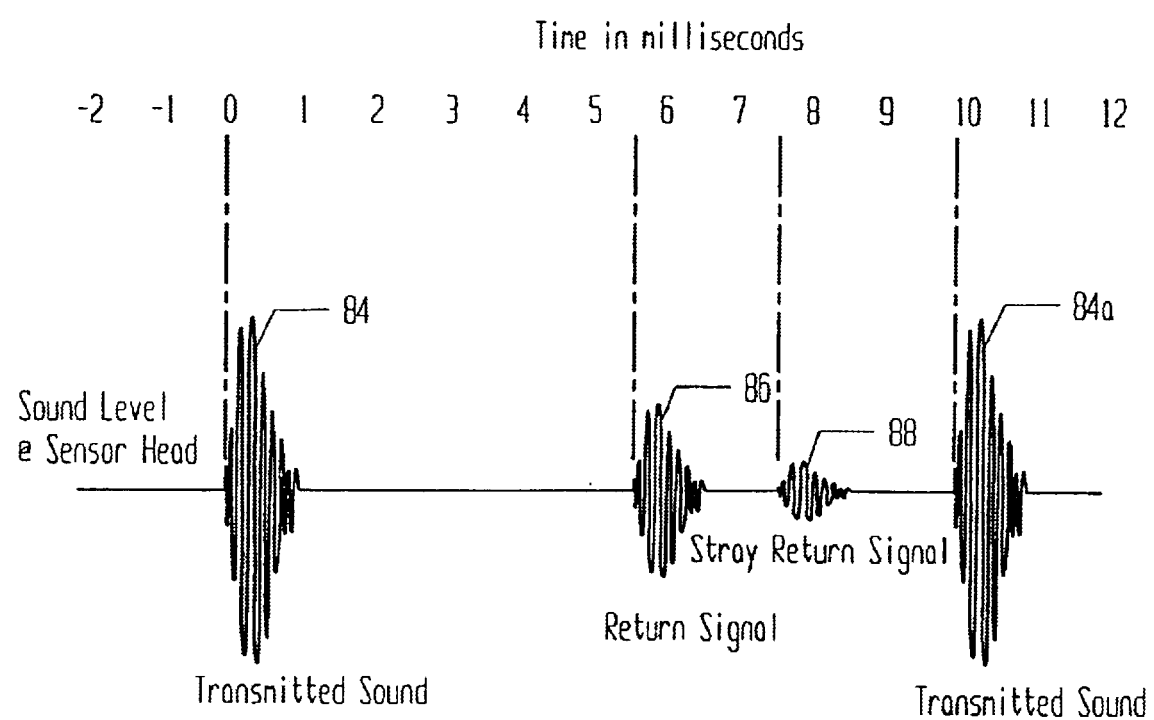
FIG. 7 is a graphic depiction of the operation of an acoustic sensor with an interfering sensor source triggered simultaneously and at high repetition rates according to the present invention.

FIG. 7 graphically depicts a method for eliminating the possibility for inter-sensor interference by simultaneously transmitting sound pulses 84 respectively from each of sensors 48a, 48b, 52a, 52b and compensating sensor 50. The length of proper measurement paths 76a, 76b, 76c, and 76d are the shortest compared to interference paths (such as paths 79a, 79b, 79c, 79d, 81a, and 81b in FIG. 4), and therefore the first return signal 86 which can be received by sensors 48a, 48b, 52a, 52b, and compensating sensor 50 are the ones which originated from themselves. Interfering stray return signals 88 coming from other sensors 48a, 48b, 52a, 52b, and compensating sensor 50 will only arrive afterward. Acoustic sensors 48a, 48b, 52a, 52b, and compensating sensor 50 will respond to the first return signal 86 or stray return signal 88 that they hear, and thus interference will not occur.

Typical processes make layflat film 34 that is 100 inches (about 250 cm) or less across. Sensors 48a, 48b, 52a, 52b, and 50 are located as close to the largest bubble 24 as possible while retaining a buffer of typically 4 inches (about 10 cm) of measurement range for control purposes. With this geometry, the longest path length for interference is around 100 inches (250 cm) and at the speed of sound of about 13,633 inches per second (about 346 m/sec), this translates into a time lag of 7.3 milliseconds between the transmitted sound pulse 84 and the worst case stray return signal 88. The transmission of the following simultaneous sound pulses 84a must occur after the worst case sound pulse 84 arrives and preferentially occurs every 10 milliseconds resulting in 100 samples per second for each sensor 48a, 48b, 52a, 52b and 50. If the bubble 24 size is smaller, the sampling rate can be increased accordingly, depending on the worst case interference path length and can be as high as 300 samples per second for layflat film 34 that is about 24 inches (about 60 cm).

Figure 8:
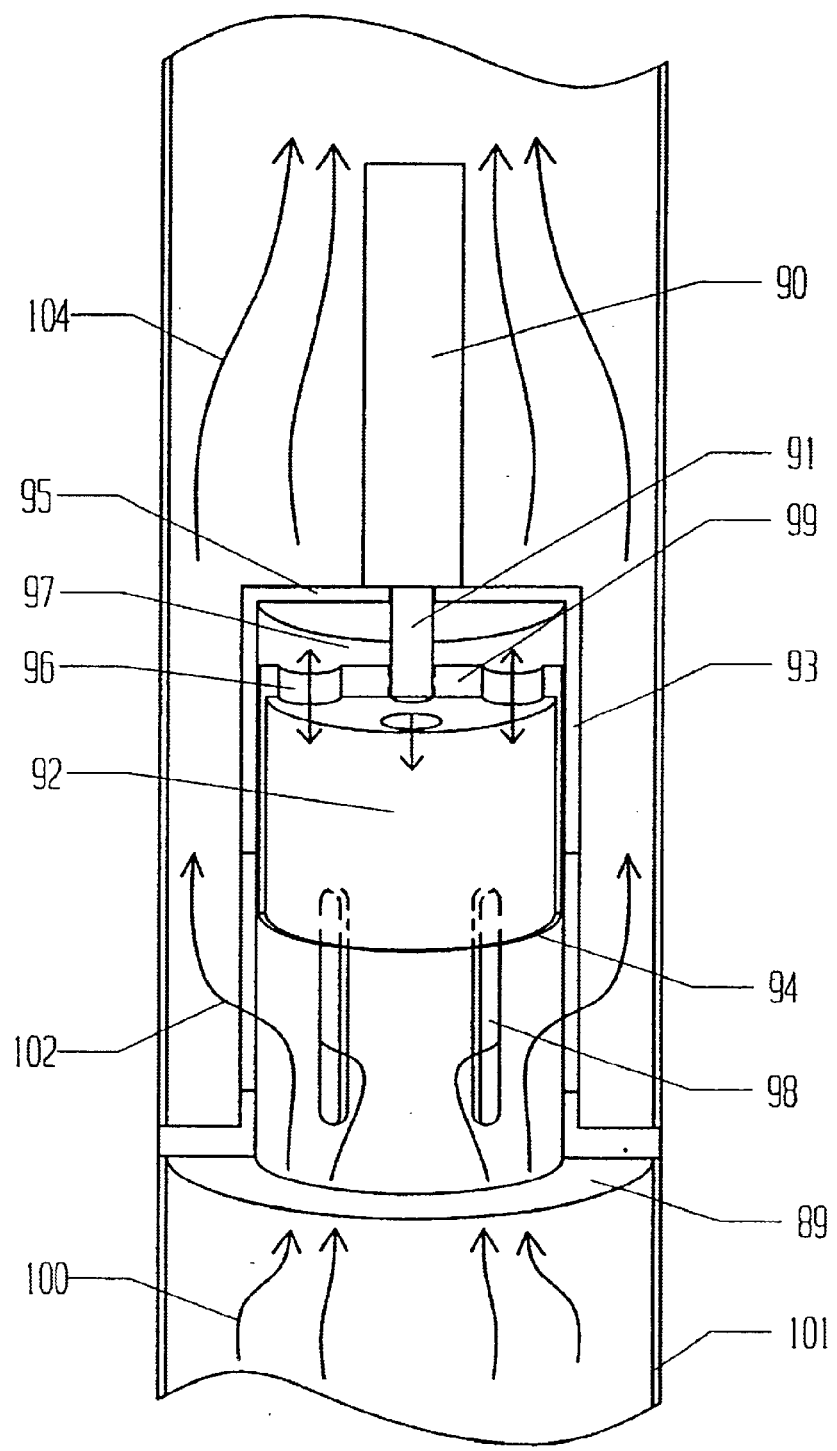
FIG. 8 is a cross-section view of a servo driven linear air actuator according to the present invention.

According to an embodiment of the present invention, FIG. 8 shows a schematic cross-sectional view of a valve system. This is generally similar to a previously used, prior art valve system with two key changes. First, rather than using an air cylinder as in a prior design, a linear servo 90 is directly connected to air actuating piston 92 for driving piston 92. Air actuating piston 92 is cylindrical and concentrically located inside of valve body wall 93. The second modification is that a small air gap 94, just large enough to ensure no contact between air actuating piston 92 and valve body wall 93, is provided to create frictionless movement of the piston relative to the valve body wall.

Air actuating piston 92 moves linearly inside of valve body wall 93 to cover and uncover longitudinal air regulating slots 98 to a variable degree determined by the present position of air actuating piston 92 under the control of linear servo 90. To ensure no leakage flow of air, valve body end 95 fully covers one end of valve body wall 93 with the opposite end remaining open and provides a convenient mounting point for linear servo 90. Piston end 99 partially covers one end of air actuating piston 92 with the opposite end remaining uncovered and provides a connection point to linear servo shaft 91. Pressure equalizing holes 96 are provided through piston end 99 to prevent pressure or vacuum from building in air volume 97 due to motion of air actuating piston 92 within valve body wall 93 and valve body end 95.

Valve body flange 89 extends radially outwardly from an open end of valve body wall 93 and concentrically seals it inside of external pipe 101 forcing incoming air flow 100 to flow fully into the open end of valve body wall 93. As air actuating piston 92 varies the open area of longitudinal air regulating slots 98, slot air flow 102 is controlled and flows through valve body wall 93 and is contained by the continuation of external pipe 101, forcing controlled air flow 104 to continue through external pipe 101 to its destination. Except for any minor leakage in pipes and/or joints or pressure differences due to control, incoming air flow 100, slot air flow 102 and controlled air flow 104 are substantially the same. Further, the positioning response of 5 to 10 msec to a resolution of 0.004 inch (about 0.1 mm) of linear servo 90, linear servo shaft 91 and air actuating piston 92 allow for accurate and fast control of controlled air flow 104 allowing for control of natural tube size changes in bubble 24.

As indicated above, the use of covered and uncovered longitudinal slots was known, but use of a servo motor and frictionless movement improve response time.

Having described certain embodiments, it should be understood that modifications can be made without departing from the spirit and scope of the invention as defined in the appended claims. Furthermore, while certain components may be described as having certain advantages, modifications could be made with other components with some features and advantages that are different.

What is claimed is:

1. In an extrusion system having a die for receiving molten plastic and for providing from the die a bubble that exits the die in molten form and that solidifies above a frost line, the system providing cooling air on the bubble as it exits the die, the system comprising:

a plurality of acoustic bubble sensors each arranged to provide a sound pulse to a bubble and to sense the sound pulse after it bounces off the bubble, the bubble sensors for providing data to indicate a position of the bubble; and a controller responsive to data from the plurality of bubble sensors for controlling a flow of cooling air to the bubble, the controller disregarding data from a sensor that is blocked so that the sensor cannot sense the sound pulse after it bounces off the bubble, and continuing to use data from at least one other bubble sensor to determine a position of the bubble.

2. The system of claim 1, wherein the controller provides notification that data from the sensor is being disregarded, the notification including causing a warning light to change states.

3. The system of claim 1, wherein the system can operate with one and only one sensor at a given vertical position while data from at least one other sensor is disregarded.

4. The system of claim 1, wherein the controller determines if received data from a sensor is outside a desired range and disregards the data after a number of out-of-range data samples exceeds a threshold.

5. The system of claim 1, further comprising a sensor at a vertical position different from that of the bubble sensors for sensing ambient conditions.

6. The system of claim 1, further comprising a bubble cage around the bubble.

7. The system of claim 1, wherein the controller determines if data from a bubble sensor is outside a defined band for data detected from the bubble sensors.

8. The system of claim 1, wherein the controller uses data from one or more other bubble sensors and excludes data from the blocked bubble sensor.

9. The system of claim 1, wherein the controller uses data from one or more other bubble sensors and uses a last good sample from the blocked bubble sensor.

10. The system of claim 1, wherein the controller disregards all data from the blocked bubble sensor until that bubble sensor provides a threshold number or percent of samples within a desired range.

11. In an extrusion system having a die for receiving molten plastic and for providing from the die a bubble that exits the die in molten form and solidifies above a frost line, the system blowing cooling air on the bubble below the frost line, a method comprising:
receiving information about a position of the bubble from a plurality of bubble sensors located at a vertical position;
controlling a flow of air to the bubble in response to data from the bubble sensors; and
disregarding out-of-range data from a sensor and using data from a remaining sensor to control the flow of air.

12. The method of claim 11, further comprising providing a notification that data from die sensor with out-of-range data is being disregarded.

13. The method of claim 11, further comprising determining if data is out-of-range by defining a deviation band based on variations derived from a normal deviation for data detected from the bubble sensors and determining if data is outside the deviation band.

14. The method of claim 11, wherein the using of data from a remaining bubble sensor is done to the exclusion of any data from the sensor with the out-of-range data.

15. The method of claim 11, wherein the using of data from a remaining bubble sensor further includes using a last good sample from the sensor with the out-of-range data.

16. The method of claim 11, further comprising disregarding all data from any bubble sensor with the out-of-range data until that bubble sensor provides a threshold number or percentage of samples within a desired range.

17. The method of claim 11, wherein the bubble sensors are acoustic sensors.

18. The system of claim 5, wherein the sensor for sensing ambient conditions senses one or more of temperature, humidity, and pressure.

19. In an extrusion system having a die for receiving molten plastic and for providing from the die a bubble that exits the die in molten from and solidifies above a frost line the system blowing cooling air on the bubble below the frost line, a method comprising:
receiving information about a position of the bubble from a plurality of sensors;
controlling a flow of air to the bubble below the frost line in response to data from the sensors;
disregarding any our-of-range data and using data from one or more of the remaining sensors to control the flow of air.

20. The method of claim 19, further comprising determining if data is out-of-range by defining a deviation band based on variations derived from a normal deviation for data detected from the sensors and determining if data is outside the deviation band.

21. In an extrusion system having a die for receiving molten plastic and for providing from the die a bubble that exits the die in molten form and that solidifies above a frost line, the system blowing cooling air on the bubble as it exits the die, the system comprising:
a plurality of sensors arranged for providing data indicating a position of the bubble;
controller responsive to data from the sensors for controlling a flow of air to the bubble below the frost line, the controller receiving data from the sensors, disregarding out-of-range data from any sensor, using data from the remaining sensors to determine a position of the bubble, and providing a notification that dare from any sensor is being disregarded.

22. The system of claim 21, wherein the controller determines if received data is disregarded from a sensor after a number of out-of-range data samples outside a desired range exceeds a threshold, and is used after a number of data samples are in a desired range.

23. In an extrusion system having a die for receiving molten plastic and for providing from the die a bubble that exits the die in molten form and that solidifies above a frost line, the system blowing cooling air on the bubble as it exits the die, the system further comprising:
a first sensor for sensing a position of the bubble at a vertical position above the frost line after the bubble has solidified;
a second sensor for sensing a position of the bubble at a vertical location below that of the first sensor and at or below the frost line;
a controller responsive to signals from the first and second season for controlling the flow of cooling air on the bubble;
at least a third sensor for sensing a position of the bubble above we frost line, the controller being responsive to two of the first, second, and third sensors and being capable of disregarding signals from one of the first, second, and third sensors and using data from the other of the first, second, and third sensors.

24. The system of claim 23, wherein the third sensor is above the frost line.

25. The system of claim 23, wherein the third sensor is at or below the frost line.

26. The system of claim 23, further comprising a fourth sensor for sensing a position of the bubble, the controller being responsive to three of the first, second, third, and fourth sensors and being capable of disregarding signals from one or more of the remaining sensors.

27. The system of claim 23, further comprising a fourth sensor for a position of the bubble at or below the frost line, the controller being responsive to the first, second, third, and fourth sensors and being capable of disregarding signals from one of the first and third sensors and using data horn the other of the first and third sensors, and being capable of disregarding signals from one of the second and fourth sensors and using data from the other of the second and fourth sensors.

* * * * *